(12) United States Patent
Yu

(10) Patent No.: US 8,763,211 B1
(45) Date of Patent: Jul. 1, 2014

(54) BINDING BELT-BASED ROD MEMBER CLAMPING DEVICE

(71) Applicant: Cheng-Che Yu, Taipei (TW)

(72) Inventor: Cheng-Che Yu, Taipei (TW)

( * ) Notice: Subject to any disclaimer, the term of this patent is extended or adjusted under 35 U.S.C. 154(b) by 0 days.

(21) Appl. No.: 13/815,437

(22) Filed: Mar. 4, 2013

(51) Int. Cl.
*A44B 11/14* (2006.01)
*B60P 7/08* (2006.01)

(52) U.S. Cl.
USPC ............ 24/191; 24/68 R; 24/69 ST; 24/69 R; 24/70 R; 24/68 E

(58) Field of Classification Search
USPC .. 24/68 R, 68 SK, 69 R, 70 R, 71 SK, 69 ST, 24/68 E, 191
See application file for complete search history.

(56) References Cited

U.S. PATENT DOCUMENTS

| | | | |
|---|---|---|---|
| 4,229,862 A * | 10/1980 | Kubelka | 24/68 SK |
| 4,475,607 A * | 10/1984 | Haney | 188/67 |
| 4,639,978 A * | 2/1987 | Boden | 24/134 R |
| 4,683,620 A * | 8/1987 | Valsecchi et al. | 24/71 SK |
| 4,761,898 A * | 8/1988 | Courvoisier et al. | 36/50.5 |
| 5,416,952 A * | 5/1995 | Dodge | 24/68 R |
| 5,745,959 A * | 5/1998 | Dodge | 24/68 SK |
| 6,554,297 B2 * | 4/2003 | Phillips et al. | 280/14.22 |
| 6,560,825 B2 * | 5/2003 | Maciejczyk | 24/170 |
| 6,561,398 B1 * | 5/2003 | Cole et al. | 224/324 |
| 2004/0163216 A1 * | 8/2004 | Simonson et al. | 24/68 CD |

* cited by examiner

*Primary Examiner* — Robert J Sandy
*Assistant Examiner* — David Upchurch

(57) ABSTRACT

A binding belt-based rod member clamping device includes a binding belt having a toothed surface portion located on the upper wall thereof, a buckle affixed to a head end of the binding belt and defining an insertion hole for the insertion of a tail end of the binding belt and two series of sloping teeth respectively disposed at two opposite lateral sides of the insertion hole, and a locking lever having a teethed cam located at one end thereof and pivotally coupled to the buckle and turnable to engage the toothed surface portion of the binding belt after insertion of the tail end of the binding belt through the insertion hole and two pawls bilaterally disposed near a rear end thereof and adapted for engaging the two series of sloping teeth of the buckle to lock the tail end of the binding belt in the inserted position.

3 Claims, 5 Drawing Sheets

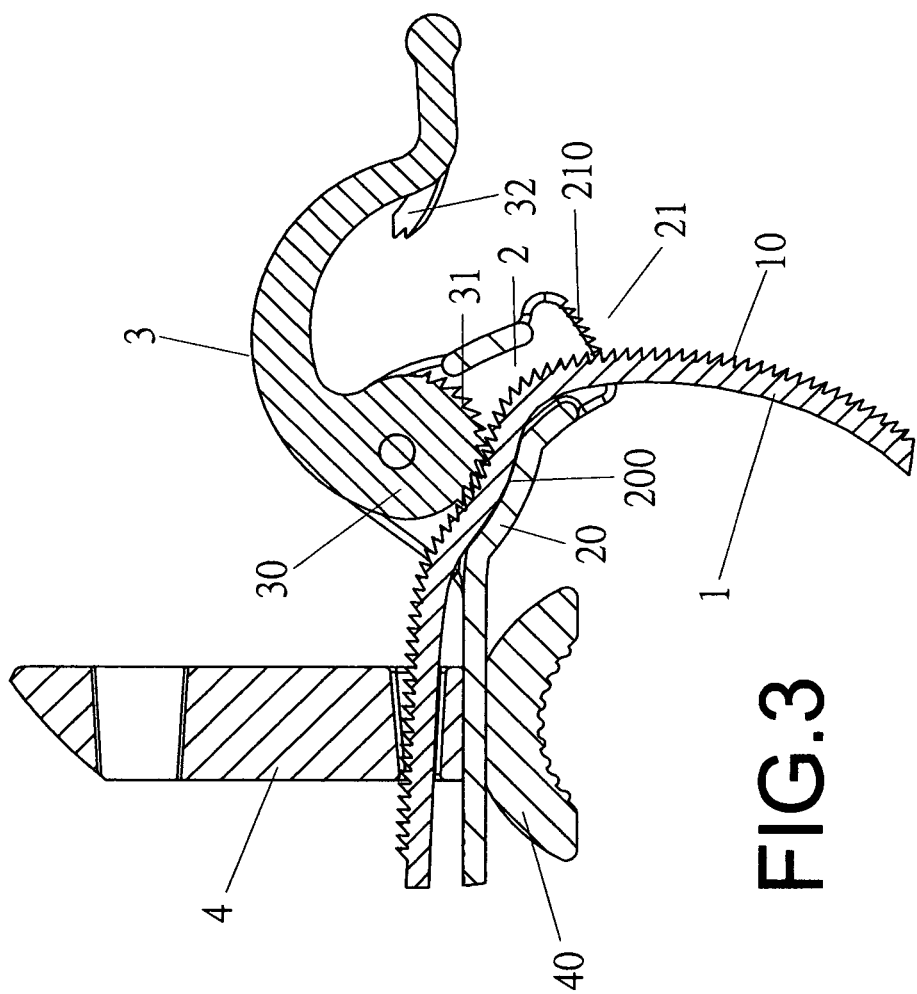

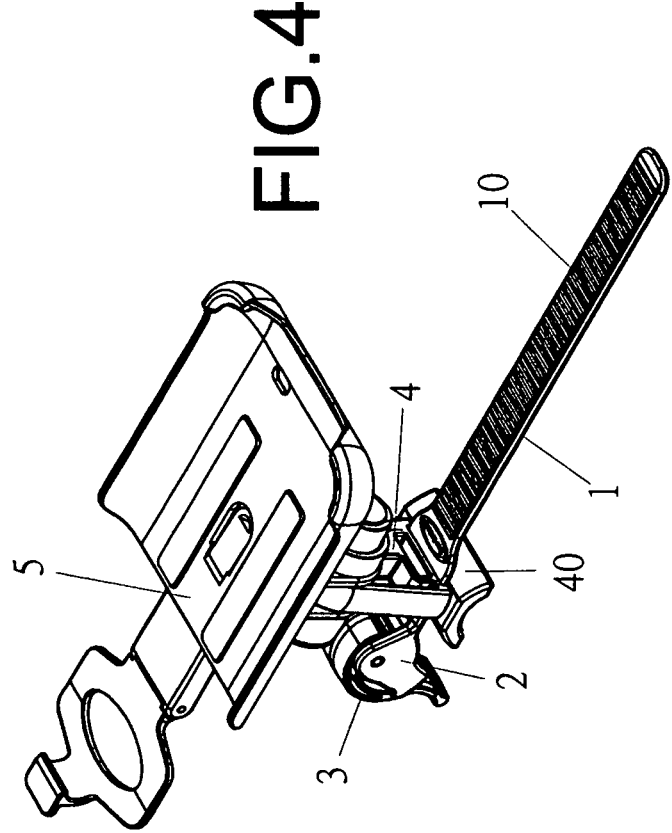

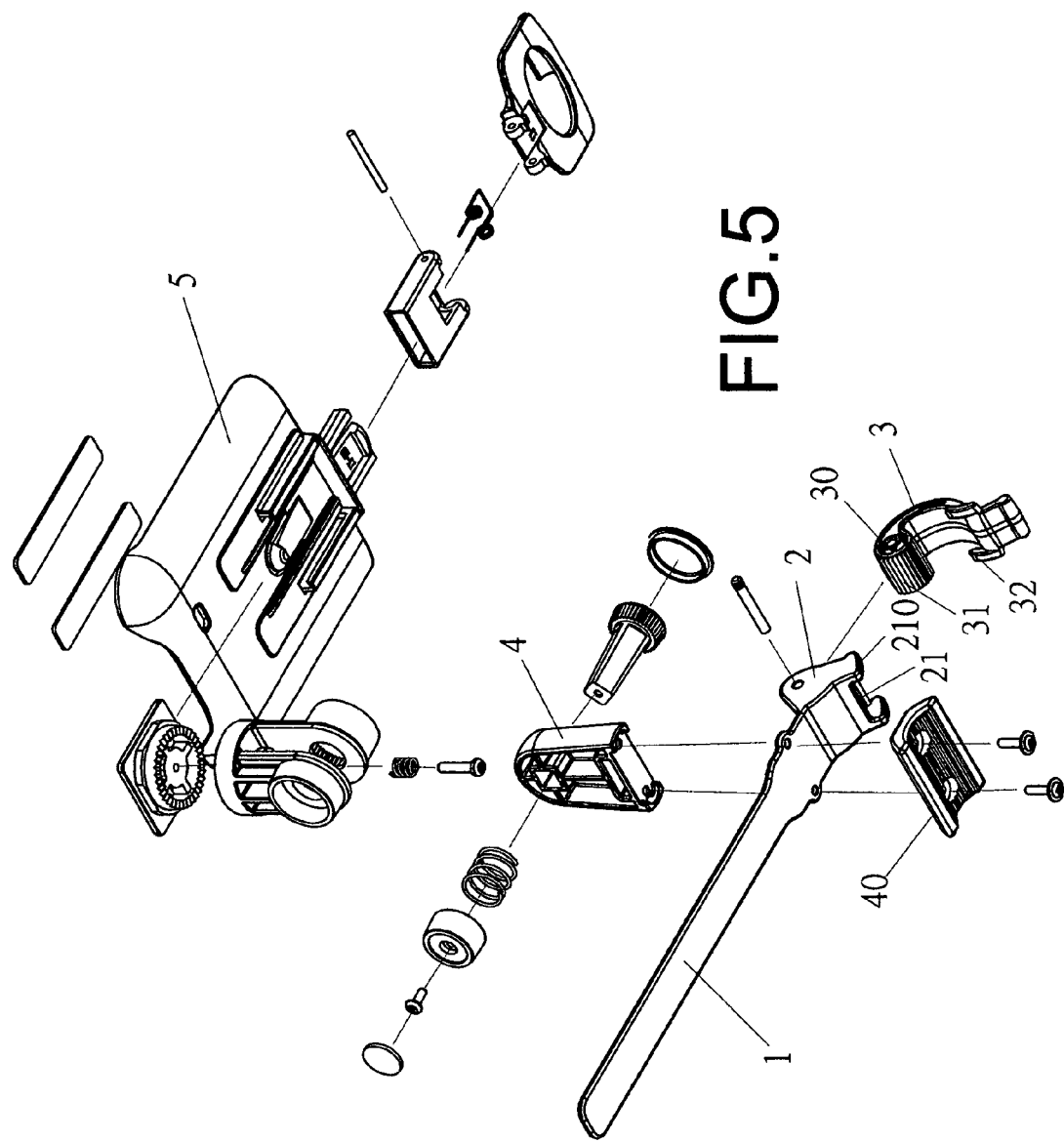

BINDING BELT-BASED ROD MEMBER CLAMPING DEVICE

BACKGROUND OF THE INVENTION

1. Field of the Invention

The present invention relates to fastening technology and more particularly, to a binding belt-based rod member clamping device, which is convenient to use and suitable for securing a carriage to a rod member of a vehicle or any other object to carry a load.

2. Description of the Related Art

A binding belt assembly for fastening a carriage to a rod member is known comprising a binding belt for winding round the rod member, a buckle located at the head end of the binding belt, and a locking lever pivotally connected to the head end of the binding belt and adapted to lock the tail end of the binding belt to the head end after the binding belt has been wound round the rod member and the tail end of the binding belt has been inserted through the buckle. According to this design, the locking lever comprises a toothed block protruded from cam portion at one end thereof movable into engagement with the tail end of the binding belt against a planar guide groove of the buckle. This design of binding belt assembly is not satisfactory in function. Due to limited engaging surface area between the locking lever and the tail end of the binding belt, the binding belt may slip relative to the rod member during application.

SUMMARY OF THE INVENTION

The present invention has been accomplished under the circumstances in view. It is one object of the present invention to provide a binding belt-based rod member clamping device, which is convenient to use and suitable for securing a carriage to a rod member of a vehicle or any other object to carry a load.

To achieve this and other objects of the present invention, a binding belt-based rod member clamping device comprises a binding belt, which comprises opposing upper wall and bottom all, opposing head end and tail end and a toothed surface portion located on the upper wall and extending along the length of the binding belt, a buckle, which is affixed to the head end of the binding belt, comprising an insertion hole for the insertion of the tail end of the binding belt, a bottom frame, an arched bearing surface located at the bottom frame and two series of sloping teeth respectively disposed at two opposite lateral sides of the insertion hole, and a locking lever, which comprises a cam pivotally coupled to the buckle and disposed adjacent to the insertion hole, a series of sloping teeth arranged around the periphery of the cam and adapted for engaging the toothed surface portion of the binding belt against the arched bearing surface of the bottom frame of the buckle to lock the tail end of the binding belt to the buckle after insertion of the tail end of the binding belt through the insertion hole of the buckle and two pawls bilaterally disposed near a rear end thereof and adapted for engaging the two series of sloping teeth of the buckle.

Preferably, the binding belt-based rod member clamping device further comprises a friction plate fixedly attached to the bottom wall of the binding belt, and a link fixedly attached to the upper wall of the binding belt and affixed to the friction plate.

BRIEF DESCRIPTION OF THE DRAWINGS

FIG. 3 is a schematic sectional view of the present invention, illustrating the locking lever moved to the locking position and engaged with the binding belt.

FIG. 4 is an oblique top elevation of the present invention, illustrating a carriage fastened to the link of the binding belt-based rod member clamping device.

FIG. 5 is an exploded view of the binding belt-based rod member clamping device in accordance with the present invention.

DETAILED DESCRIPTION OF THE PREFERRED EMBODIMENT

Figure 1:
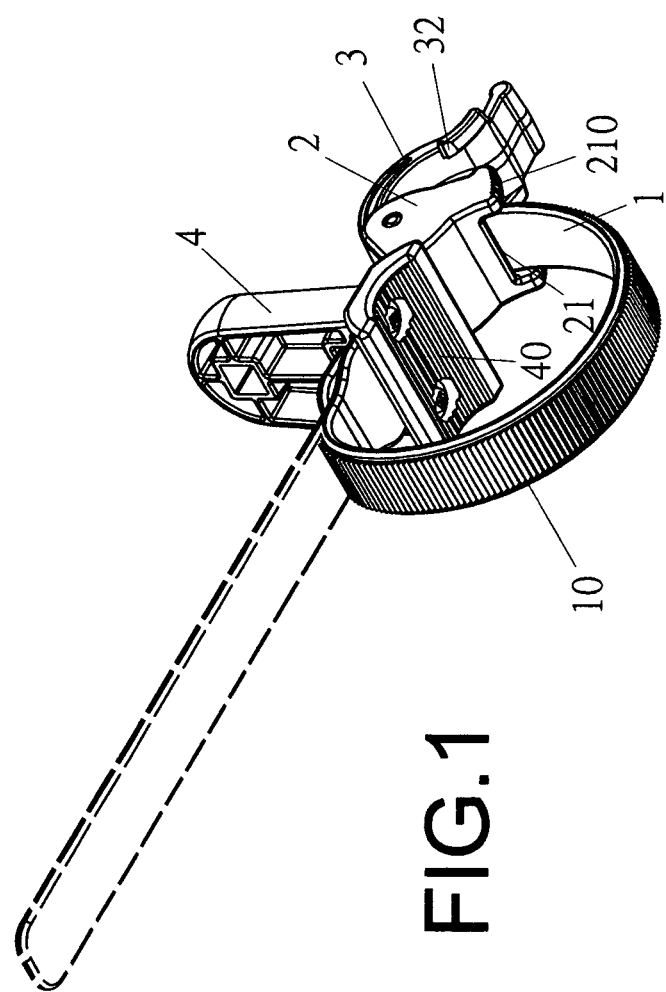
FIG. 1 is an elevational view of a binding belt-based rod member clamping device in accordance with the present invention.
Figure 2:
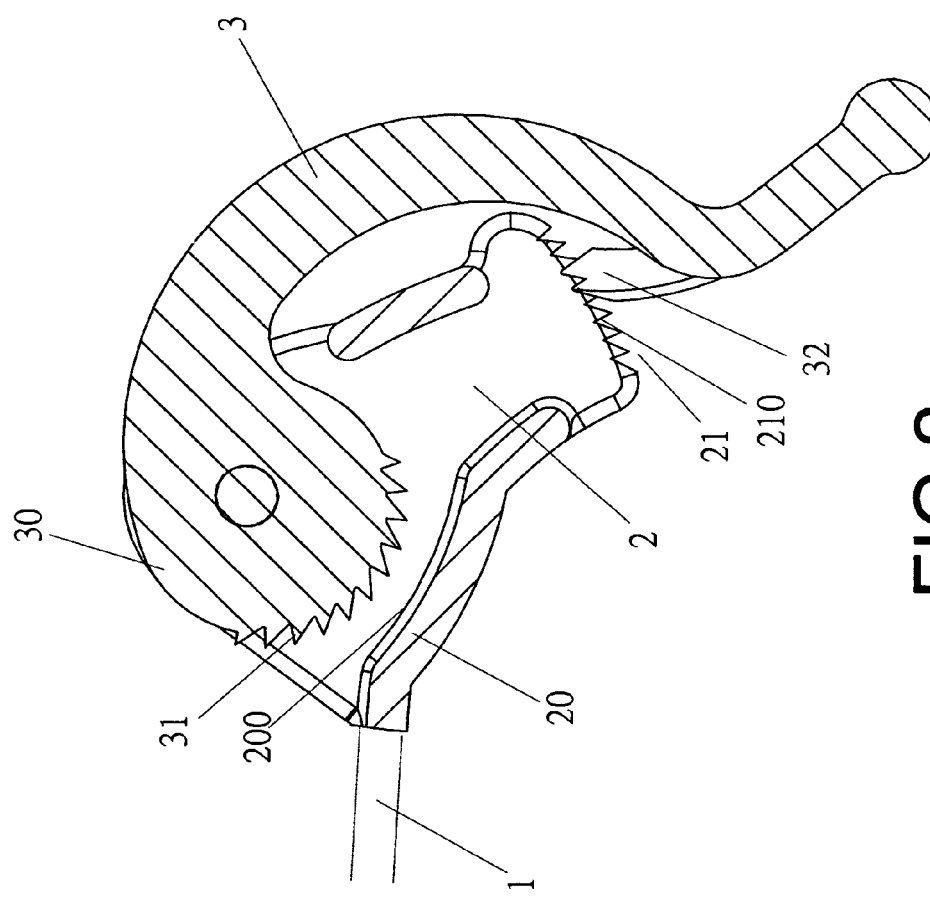
FIG. 2 is a schematic sectional view of a part of the binding belt-based rod member clamping device in accordance with the present invention.

Referring to FIGS. 1-5, a binding belt-based rod member clamping device in accordance with the present invention is shown. The binding belt-based rod member clamping device comprises a binding belt 1, a buckle 2, a locking lever 3, a friction plate 40, and a link 4.

The binding belt 1 is a narrow elongated strap member comprising a toothed surface portion 10 located on the upper wall and extending along the length thereof. The buckle 2 is affixed to one end, namely, the head end of the binding belt 1, comprising an insertion hole 21, an arched bearing surface 200 located at a bottom frame 20 thereof, and two series of sloping teeth 210 respectively disposed at two opposite lateral sides of the insertion hole 21. The locking lever 3 comprises a cam 30 pivotally coupled to the buckle 2 and disposed adjacent to the insertion hole 21, a series of sloping teeth 31 arranged around the periphery of the cam 30 and facing toward the arched bearing surface 200 of the bottom frame 20 of the buckle 2, and two pawls 32 bilaterally disposed near the rear end thereof. The friction plate 40 is fixedly attached to the bottom wall of the binding belt 1. The link 4 is fixedly attached to the upper wall of the binding belt 1 and affixed to the friction plate 40. Further, the friction plate 40 can be configured having an embossed bottom wall to enhance friction.

When using the binding belt-based rod member clamping device, wind the binding belt 1 round the assigned rod member, and then insert the tail end of the binding belt 1 through the insertion hole 21 of the buckle 2 and the gap between the cam 30 of the locking lever 3 and the arched bearing surface 200 of the bottom frame 20 of the buckle 2 and pull the binding belt 1 tightly, and then bias the locking lever 3 to move the cam 30 toward the arched bearing surface 200 and to further force the series of sloping teeth 31 into engagement with the arched bearing surface 200, and then bias the two pawls 32 of the locking lever 3 into engagement with the two series of sloping teeth 210 of the buckle 2 to lock the binding belt 1 and the link 4 to the rod member. Further, the link 4 can be installed in a carriage 5 to support a load.

When going to release the binding belt-based rod member clamping device from the rod member, reverse the aforesaid operating procedure.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A binding belt-based rod member clamping device comprising:
- a binding belt comprising opposing upper wall and bottom wall, opposing head end and tail end, and a toothed surface portion located on said upper wall and extending along the length of said binding belt;
- a buckle affixed to said head end of said binding belt, said buckle comprising an insertion hole for the insertion of said tail end of said binding belt, a bottom frame, an arched bearing surface located at said bottom frame, and two series of sloping teeth respectively disposed at two opposite lateral sides of said insertion hole; and
- a locking lever comprising a cam pivotally coupled to said buckle and disposed adjacent to said insertion hole, a series of sloping teeth arranged around the periphery of said cam and adapted for engaging said toothed surface portion of said binding belt against said arched bearing surface of said bottom frame of said buckle to lock said tail end of said binding belt to said buckle after insertion of said tail end of said binding belt through said insertion hole of said buckle, and two pawls bilaterally disposed near a rear end thereof and adapted for engaging said two series of sloping teeth of said buckle.

2. The binding belt-based rod member clamping device as claimed in claim 1, further comprising friction plate fixedly attached to said bottom wall of said binding belt, and a link fixedly attached to said upper wall of said binding belt and affixed to said friction plate.

3. The binding belt-based rod member clamping device as claimed in claim 2, wherein said friction plate comprises an embossed bottom wall facing toward said bottom frame of said buckle.

* * * * *